Oct. 10, 1944.   L. B. JONES   2,360,061
RAILWAY CAR TRUCK
Filed Dec. 1, 1942   4 Sheets-Sheet 2
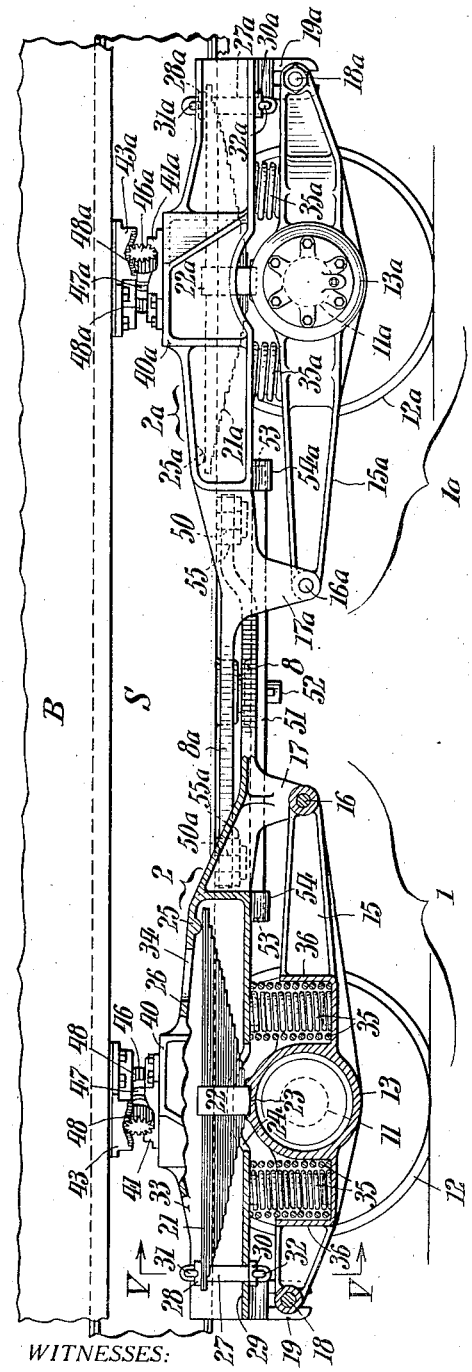
WITNESSES:
Hubert Fuchs
Thomas W. Kerr, Jr.
INVENTOR:
Lloyd B. Jones,
BY Paul + Paul
ATTORNEYS.

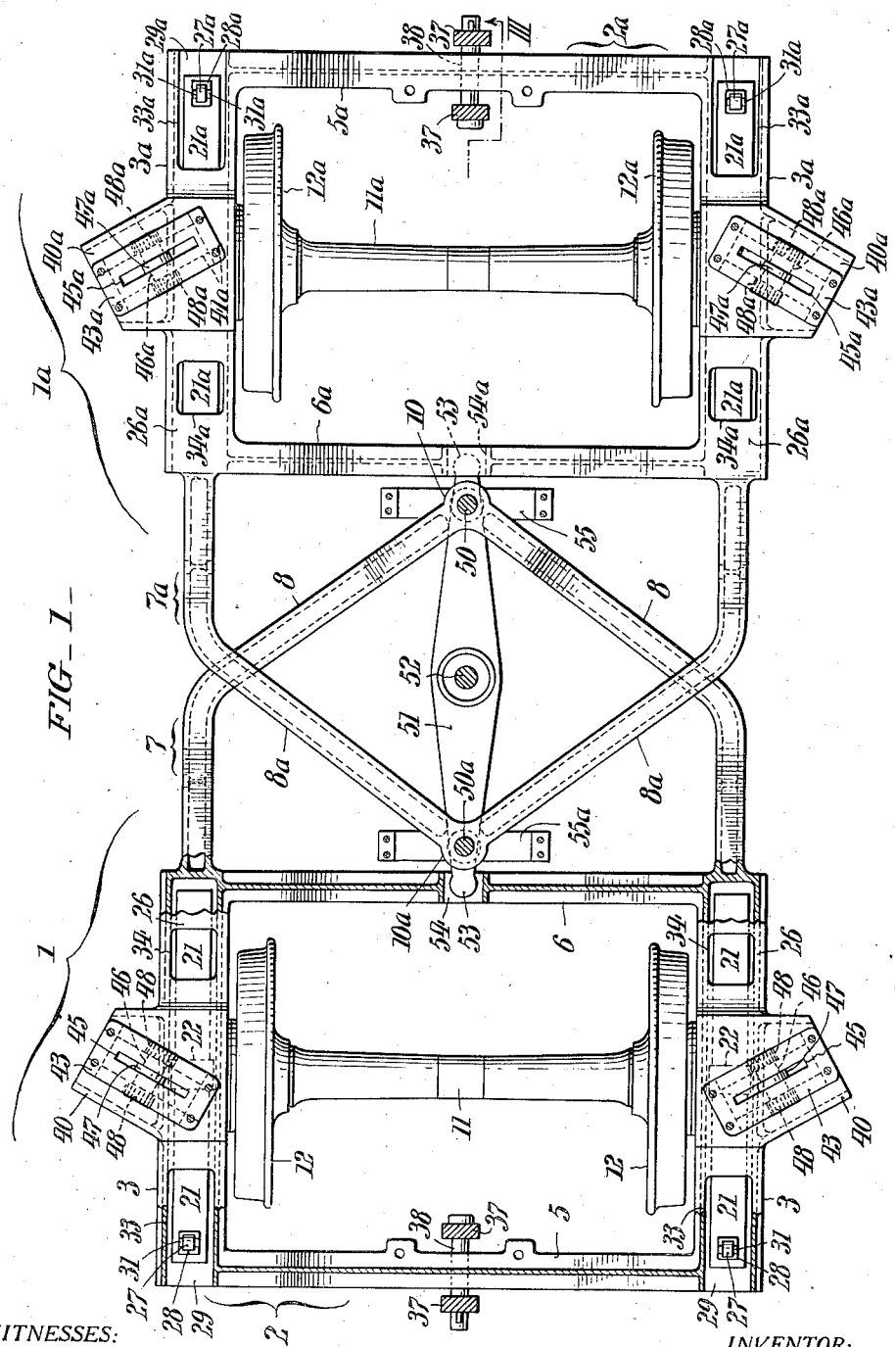

Oct. 10, 1944.  L. B. JONES  2,360,061
RAILWAY CAR TRUCK
Filed Dec. 1, 1942  4 Sheets-Sheet 3
FIG_4_
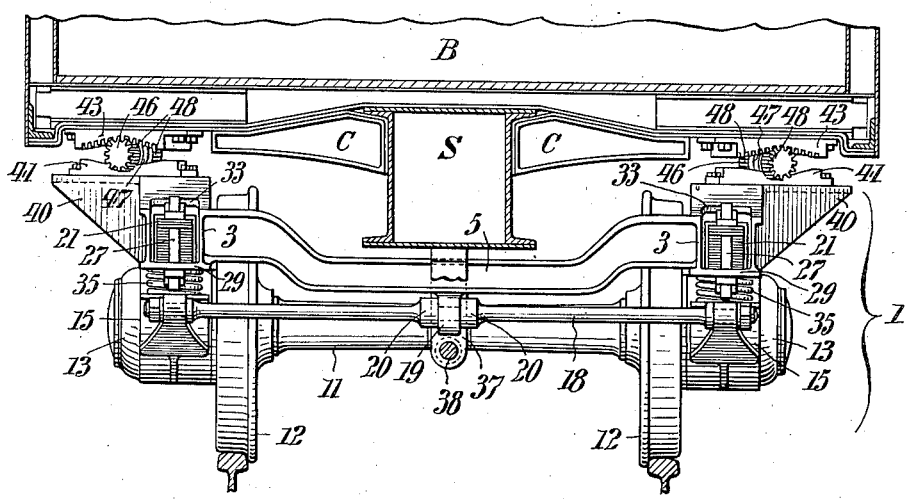
FIG_5_
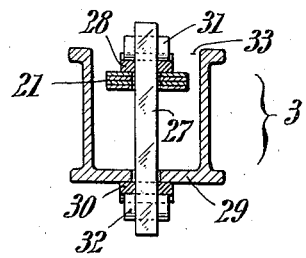
WITNESSES:
Hubert Fuchs
Thomas W. Kerr, Jr.
INVENTOR:
Lloyd B. Jones,
BY Paul + Paul
ATTORNEYS.

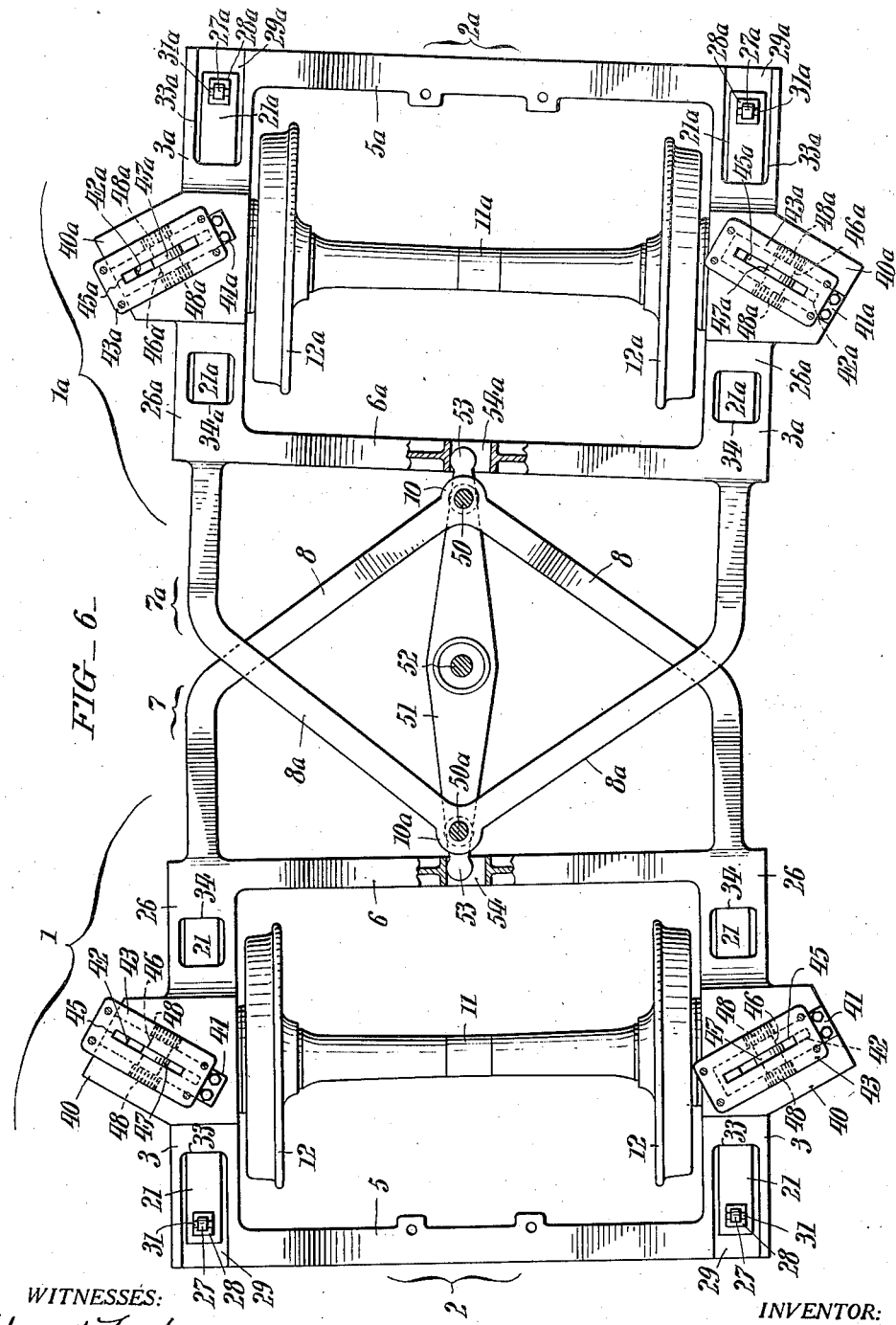

Patented Oct. 10, 1944

2,360,061

UNITED STATES PATENT OFFICE 2,360,061

RAILWAY CAR TRUCK

Lloyd B. Jones, Hollidaysburg, Pa., assignor to The Pennsylvania Railroad Company, Philadelphia, Pa., a corporation of Pennsylvania Application December 1, 1942, Serial No. 467,504

22 Claims. (Cl. 105—167)

This invention relates to trucks for vehicles confined to travel on rails, particularly railroad freight and/or passenger cars.

In connection with trucks of the type referred to, I aim to secure the advantages of greater structural simplicity and lightness as compared to prior art trucks without sacrifice in strength or safety; to enable quicker assembling of the component parts which enter into the construction of the trucks; to facilitate mounting of the car bodies upon the trucks with assurance against liability to derangement of the trucks in extensive service; to attain greater flexibility with improved wheel alignment when rounding curves; and in general, to improve the riding qualities in such trucks.

The foregoing I realize in practice as hereinafter more fully disclosed, in a car truck consisting of two interconnected wheeled sub components which are capable of independent swivelling movement relative to the car body in rounding track curves and by which the car body is supported without the need of a bolster or bolsters; and having spring suspensions which are so incorporated and arranged as to effectively preclude transmission of travel or braking shocks to the car body.

Other objects and attendant advantages will appear from the following detailed description of the attached drawings, wherein:

Fig. 1 shows the top plan view of a car truck conveniently embodying the present improvements, a portion of one of the two component frames of the truck being broken away and shown in section to expose important structural details.

Fig. 2 is a side elevation of the truck with a portion of one of its component frames in longitudinal section.

Fig. 3 is a central longitudinal section of the truck taken as indicated by the angled arrows III—III in Fig. 1.

Fig. 4 shows the truck in end elevation as viewed from the left of Figs. 1 and 2.

Fig. 5 is a detail cross section taken as indicated by the angled arrows V—V in Fig. 2; and Fig. 6 is a view like Fig. 1 showing the positions assumed by the truck frames and wheels in resisting lateral displacement of the car body.

As herein illustrated, my improved car truck consists of two sub pony-truck components 1 and 1a which are identical in construction and opposingly arranged longitudinally of the car body comprehensively designated by the letter B in Figs. 2-4. Since the components 1 and 1a are substantial duplicates of each other, a detailed description of component 1 will hold for the component 1a whereof, in order to preclude the necessity for repetitive description, all corresponding parts have been identified by the reference numerals used for those of component 1 with the addition, however, in each instance of the letter a for convenience of ready distinction. In its construction component 1 includes a horizontal frame 2 which is integrally formed and of open rectangular configuration with hollow side portions 3 and transverse connecting end portions or cross beams 5 and 6 of I cross section. Also as shown, the frame 1 has an open longitudinal "radius" bar extension 7 beyond its cross beam 6, the side members 8 of said extension being of downwardly open channel section and converging inwardly from opposite sides of the truck toward the longitudinal center of the truck and meeting a pivot eye 10. Further included in the component 1 in the present instance is a single axle 11 with flanged wheels 12 respectively disposed immediately inward of the side portions 3 of the frame 2. The ends of the axle 11 are journaled in bearings 13 medially of the lengths of horizontal levers 15 which are pivoted at their inner ends, with capacity of up and down movement, respectively on fulcrum pins 16 extending transversely of clevised pendent bracket projections 17 on the side members 7 of the radius bar 8 adjacent the cross beam 6 of the frame 2. At their outer ends, the levers 15 are connected by a tie rod 18 which is slidingly engaged in a vertically-slotted pendent clevised projection 19 at the center of the cross beam 5 of the frame 2, endwise movement of said rod being prevented by collar enlargements 20 thereon with the opposite sides of said lug, see Fig. 4. Lodged in the hollows of the side portions 3 of the frame 2 are leaf springs 21 whereof the center bands 22 rest in recesses 23 at the tops of the journal boxes 13 after the manner instanced at the left end of Fig. 2. The inner ends of the leaf springs 21 engage beneath rounded lug projections 25 on the top webs 26 within the hollows of the side portions 3 of the frame 2. The outer ends of the springs 21 are apertured for upward penetration by shackle bars 27 and engage beneath stop collars 28 on the upper protruding ends of said bars. As shown in Figs. 2 and 5, the shackle bars 27 pass down through apertures in the lower webs 29 of the side portions 3 of the frame 2 and are provided at their lower protruding ends beneath said web with stop collars 30. The collars 28 and 30 are loose on the shackle bars 27 and abut gibs 31 and 32 which pass through transverse apertures in the ends of said bars, the several parts just described being held assembled solely by the upward pressure of the springs 21 against the collars 28. From Fig. 2 it will be particularly noted that the side portions 3 of the frame 2 are open at their outer ends as at 33 and moreover provided in their top webs 26 with hand holes 34 to facilitate insertion and placement of the springs 21 initially, and removal of said springs subsequently in the event that repairs are necessary. As instanced at the left of Fig. 2, the lower webs 29 of the side portions 3 of the frame 2 have openings 24 for downward protrusion of the spring bands 22 into engagement with the bearings 13. In addition to the leaf springs 21, the suspension for the component 1 comprises double helical springs 35 whereof there is a pair associated with each lever 15, the springs of each such pair being disposed at opposite sides of the wheel axle and compressed between the corresponding lever 15 and the lower web 29 of the contiguous side portion 3 of the frame 2, the lower ends of said springs engaging in pocket ledges 36 on said levers. The downward movement allowed the bearing levers 15 is limited by a stop means consisting of a pair of spaced brackets 37 which extend downwardly from the car body to opposite sides of the cross beam 5 of the frame 2 and which are apertured at their bottoms for passage of a transverse pin 38 at a level below the normal level of the tie rod so as to prevent said rod from dropping out of the clevised guide lug 19 in a manner which will be readily understood from Figs. 3 and 4.

Directly above the axle journals, the side portions 3 of the frame are provided with pads 40 which extend outward laterally somewhat beyond said side portions as shown in Figs. 1 and 4. Bolted to these pads 40 are cam blocks 41 which are arranged in tangential relation to the pivot center 10 of the radius bar 7 of the frame 2 and which have obtuse angle notches 42 (Fig. 6) radial to said center. Directly over the wheel axle 11 the body B of the car has a cross bearer C of composite construction (Fig. 4) to the outer elements of which are bolted cam blocks 43. As shown, these cam blocks 43 are generally like the cam blocks 41 on the frame 2 but are reversely arranged, that is to say, have laterally-spaced obtuse angular cam notches 45 which are inverted with respect to the cam notches of said blocks 41. Interposed between the cam blocks 41 and 43 are rollers 46 with smooth central portions 47 which ride the angular notches 42 and 45 of the cam blocks 41 and 43 and with toothed end portions 48 which respectively mesh with teeth on the laterally-spaced notched cam portions 45 of the blocks 43. Normally, the rollers occupy the centers of the notched cam portions of the two blocks 41, 43, as shown in Figs. 1, 2 and 4 of the drawings.

As previously stated, the two sub components 1 and 1a of the truck are opposingly arranged, and it will be seen from Figs. 1 and 2 that their radius bar extensions 7 and 7a overlap each other and have their eyes 10 and 10a engaged respectively with fulcrum studs 50 and 50a which project downwardly in spaced relation from the longitudinal median or center sill S of the car body. Extending between the two truck components 1 and 1a is a center bar 51 in the form of a lever which is medially fulcrumed on another stud 52 on the center sill S midway between the fulcrum studs 50 and 50a, the ends of said center bar being rounded as at 53 to loosely engage in slots 54 medially of the cross beams 6 and 6a of the frames 2 and 2a. For the purposes of greater rigidity, the lower fulcrum studs 50 and 50a are engaged in and braced by bridging members 55 and 55a which extend transversely of the center sill S whereto they are rigidly secured at their ends by rivets or bolts.

The braking system for the truck is not shown since it may be of any suitable design which will allow swivelling of the two components 1 and 1a.

In the operation of the truck on straight-away track, the various parts will maintain the positions in which they are illustrated in Figs. 1-4 with the rollers 46 centrally of the cam notches in the blocks 41 and 43 respectively attached to the pads 40 of the frames 2 and 2a and to the corresponding cross bearers C of the car body B, and with the springs 21, 21a and 35, 35a cooperating to absorb the shocks occasioned by travel over irregularities in the track rails as the wheel journal supporting levers 15 and 15a rock up and down.

In Fig. 6 I have illustrated how sidewise displacement of the car body can take place with respect to the truck, and how the center bar 51 operates to control such displacement. Actually in practice, the pockets 54, 54a in the frames 2, 2a are so proportioned as to allow approximately one inch lateral play to each side of each end of the center bar 51, such play corresponding roughly with that allowed in the usual types of rigid-frame car trucks in which swing hangers are employed. During rounding of track curves, the truck as a whole swivels on the center pin 52 in generally the same way as a conventional four-wheel rigid-frame car truck. That is to say, one pair of wheels is displaced to one side of the car center line, and the other pair to the other side of said center line depending upon the direction of curvature, the center bar 51 serving to maintain the two wheel axles 11, 11a substantially parallel and at the same time to resist the lateral displacement of the car body due to centrifugal action. Through my improved construction, however, each wheel flange is permitted to align itself closely to the rail within the limits of play accorded the ends of the center bar 51 in the pockets 54, 54a of the frames 2, 2a. On sharp curves, the control bar 51 will compel the truck to function more like a rigid frame truck; but on moderate curves such as are ordinarily encountered on main track, my improved truck will be more flexible with minimization of wear on the wheel flanges. Furthermore, in conventional four-wheel rigid-frame trucks, the swing hangers set up a lateral restoring force in the event of lateral body displacement; but after curving, the trucks must realign themselves to the disadvantage of causing excessive wheel flange wear. In the truck of my invention, on the other hand, lateral displacement of the rollers 46, 46a in the cam blocks 41, 43 and 41a, 43a, respectively, sets up a restoring force whether due to curvature or to lateral displacement of the car body, and thus prevents undue wheel flange wear.

From the foregoing it will be seen that my improved truck is of simple construction and composed of few parts. Due to the elimination of a bolster with the usual double spring system and accompanying secondary harmonics, the truck is not only much lighter in weight, but has better riding qualities than car trucks of prior art designs. As a consequence of the novel construction of the truck, the braking force is transmitted directly to the radius fulcrum pins of the two sub components and thence to the car body without affecting the load distribution among the truck springs. Each wheeled sub component will swivel about its own radius center, and although the two components are connected and controlled by the center bar, they will readily adapt themselves independently to track curves. The truck is thus characterized by great flexibility with improved wheel alignment when rounding curves. The leaning tendency of the car body under centrifugal action at curves is transmitted directly through the radial rollers and the cam blocks to the truck frames with attendant tilting of the car body, there being no independent movement of the truck frames and the car body in the absence of a truck bolster. Reduction of unsprung weight results from the aforedescribed placement and arrangement of the spring system, and pedestal friction is eliminated through pivoting of the journal bearings.

Having thus described my invention, I claim:

1. In a car truck, a pair of axles respectively with flanged track-engaging wheels; independently movable overlappingly-arranged frames with journal bearings for the respective wheel axles, said frames reaching inwardly of the truck in opposed relation to points respectively beyond the truck center and being there pivotally connected to the car body; and means for controlling the movement of the frames relative to the car body.

2. A railway car truck according to claim 1, wherein the frames provide supports for the car body directly over the journal bearings; wherein the journal bearings for the wheel axles are carried by levers which are fulcrumed for independent up and down movement on the respective frames; wherein leaf springs are interposed respectively between the individual journal bearings and the frames, with their centers resting on the tops of the corresponding journal and their ends supporting the frames at opposite sides of the truck; and wherein helical springs are in compression between the respective levers and the frames at opposite sides of the wheel axles.

3. In a car truck, a pair of counterpart frames respectively with journal bearings for wheel axles and respectively having radius arm extensions of equal length which are opposingly arranged in overlapping relation and pivoted for independent swivelling movement of the frames, in the longitudinal median of the car body; and a connecting center bar attached to the car body with its ends loosely engaging slots in the two frames to control the swivelling of the latter.

4. A car truck according to claim 3, wherein the center bar is secured in the longitudinal median of the car body at a point intermediate the pivots of the two frames.

5. A car truck according to claim 3, wherein the car body is supported by the two frames at points directly over the journal bearings of the respective wheel axles.

6. A car truck according to claim 3, wherein the frames are provided above the axle journal bearings with supports whereon the car body rests with interposition of rollers radial to the swivel axes respectively of the two frames.

7. A car truck according to claim 3, wherein the axle journal bearings are connected to the frames with capacity for independent up and down movement; and wherein resilient cushioning means are interposed between the frames and the respective journal bearings.

8. A car truck according to claim 3, wherein the axle journal bearings are carried by levers individually fulcrumed inward of the wheel axles for up and down movement to the respective frames; and wherein resilient cushioning means are interposed between said levers and said frames.

9. A car truck according to claim 3, wherein the axle journal bearings are carried by levers individually fulcrumed inward of the wheel axles for independent up and down movement to the respective frames; wherein the frames are supported by leaf springs of which the centers rest on the tops of the journal bearings; and wherein auxiliary helical springs are in compression between the frames and the individual levers at opposite sides of the wheel axles.

10. A car truck according to claim 3, wherein the side portions of the frames are hollow; wherein the journal bearings are carried by individual levers fulcrumed inward of the wheel axles for independent up and down movement to the respective frames; wherein leaf springs disposed in the side hollows of the frames constitute cushioning supports for the frames, with straps at their centers extending down through openings in the bottom webs of the side portions of the frames and resting on the tops of the journal bearings; and wherein helical springs are in compression between the bottom webs of the side portions of said frames and the individual levers at opposite sides of the journal bearings of the respective wheels.

11. A car truck according to claim 1, wherein the pivots for the frames are located in the longitudinal median of the car body.

12. A car truck according to claim 1, wherein the respective frames provide supports for the car body immediately above corresponding wheel axle journal bearings.

13. A car truck according to claim 1, wherein the respective frames provide supports for the car body immediately above corresponding axle journal bearings; wherein the journal bearings are movable up and down relative to the respective frames; and wherein resilient cushioning means are interposed between said frames and the individual journal bearings.

14. A car truck according to claim 1, wherein the respective frames provide supports for the car body immediately above corresponding wheel axle journal bearings; wherein the journal bearings are pivotally connected for up and down movement relative to the respective frames; and wherein resilient cushioning means are interposed between the individual journal bearings and the respective frames.

15. A car truck according to claim 1, wherein the car body is supported by the respective frames with interposition of rollers radial to the respective swivel centers directly above the wheel axle journal bearings.

16. A car truck according to claim 1, wherein the car body is supported by the respective frames with interposition directly above the wheel axle journal bearings of opposing V-cam devices with cooperating rollers radial to the respective swivel centers.

17. A car truck according to claim 1, wherein the respective frames provide supports for the car body immediately above corresponding wheel axle journal bearings; wherein the journal bearings are carried by levers fulcrumed for independent up and down movement to the respective frames; wherein cushioning means are interposed between the journal bearings and the respective frames; and wherein additional cushioning means are interposed between the individual levers and said frames.

18. A car truck according to claim 1, wherein the respective frames provide supports for the car body immediately above corresponding wheel axle journal bearings; wherein the journal bearings are carried by levers fulcrumed for independent up and down movement to the respective frames; wherein the journal bearings supporting levers associated with the respective frames are coupled by crosswise tie bars; wherein cushioning means are interposed between the journal bearings and the respective frames; and wherein additional cushioning means are interposed between the individual levers and the frames.

19. A car truck according to claim 1, wherein the respective frames provide supports for the car body immediately above corresponding wheel axle journal bearings; wherein the journal bearings are carried by levers fulcrumed for independent up and down movement to the respective frames; wherein the journal bearing supporting levers associated with the respective frames are coupled by crosswise tie bars; wherein cushioning means are interposed between the journal bearings and the respective frames; wherein additional cushioning means are interposed between the individual levers and the frames; and wherein stop means on the car body cooperate with the tie bars to limit downward movement of the levers.

20. A car truck according to claim 1, wherein the car body is supported on the frames; wherein the wheel axle journal bearings are connected to the frames with capacity for independent up and down movement; and wherein leaf springs are interposed between the individual journal bearings and the frames, with the frames supported at the sides of the truck by the ends of the leaf springs and with the centers of said springs resting on the tops of the respective journal bearings.

21. A car truck according to claim 1, wherein the car body is supported on the frames; wherein the wheel axle journal bearings are connected to the frames with capacity for independent up and down movement; and wherein leaf springs are interposed between the individual journal bearings and the frames, with the frames supported at the sides of the truck by the ends of the leaf springs and with the centers of said springs resting on the tops of the respective journal bearings; and wherein juxtaposed helical springs at opposite sides of the wheel axles are in compression between said journal bearings and the corresponding side portions of the frames.

22. In a car truck, a pair of complemental frames free of connection with each other respectively having journal bearings for axles with flanged track-engaging wheels, and rigid radius arm extensions opposingly arranged in overlapping relation, the ends of said arms being pivoted to the car body at spaced points in the length of the latter, for capacity of the frames to swivel independently of each other in rounding curves and as their respective wheels pass from tangent to curved track or vice versa; and means for controlling the swivelling movement of the frames relative to the car body.

LLOYD B. JONES.